Sept. 6, 1966     E. J. SAUNDERS     3,271,050
HITCH BAR PROTECTOR
Filed Dec. 14, 1964
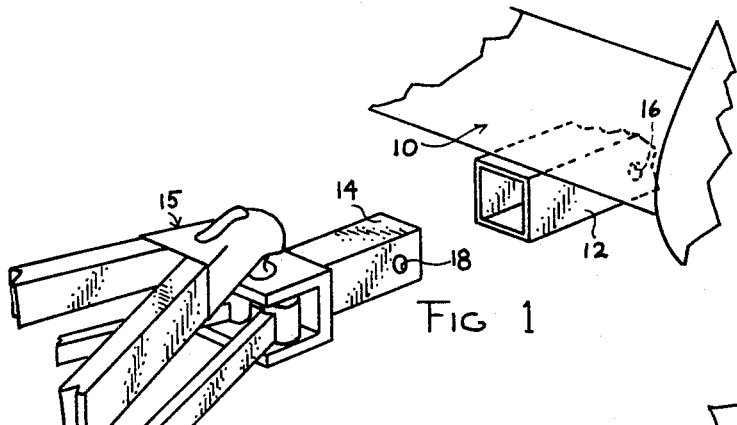
FIG 1
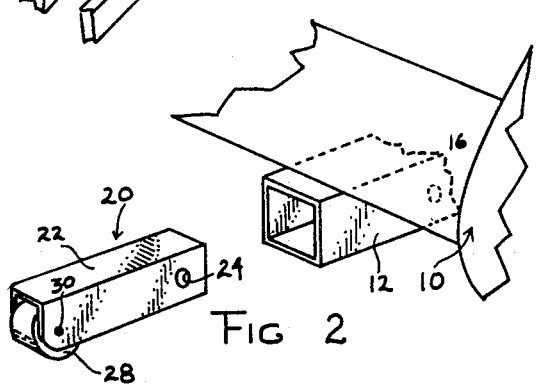
FIG 2
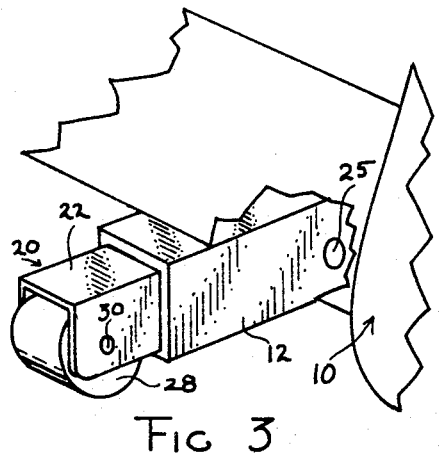
FIG 3
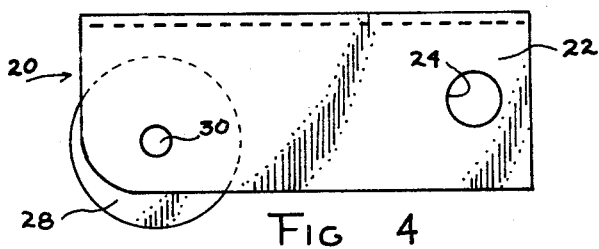
FIG 4
FIG 5
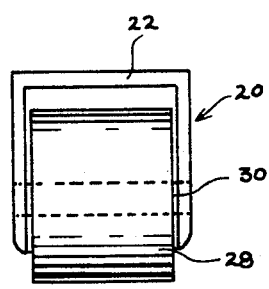
FIG 6
INVENTOR
ELDON J. SAUNDERS
BY William L. Fisher
HIS ATTORNEY

United States Patent Office 3,271,050
Patented Sept. 6, 1966

3,271,050
HITCH BAR PROTECTOR
Eldon J. Saunders, 13420 Frazo Road, Warren, Mich.
Filed Dec. 14, 1964, Ser. No. 418,051
3 Claims. (Cl. 280—507)

This invention relates to trailer hitches for road vehicles and its object is to provide a simple and inexpensice device for closing off the trailer hitch bar on the tractors which pull the trailers. Such object of the invention and its advantages will become apparent during the course of the following description taken in conjunction with the accompanying drawings in which:

FIG. 1 is an exploded view in perspective of part of an automobile equipped with a trailer hitch bar and of a trailer hitch receivable in such hitch bar;

FIG. 2 is a similar exploded view in perspective of the same part of the automobile and of a trailer hitch bar close-off device embodying the present invention;

FIG. 3 is a perspective view of said device assembled in the trailer hitch bar; and FIGS. 4 to 6 are, respectively, side elevational, bottom plan, and front end elevational views of said device.

Referring to the drawings in greater detail, 10 designates an automobile which is the most common tractor for hauling trailers especially in the case of boat trailers. The automobile 10 is equipped with a trailer hitch bar 12 which is mounted beneath the body and projects rearwardly as shown to receive the projecting end 14 of the type of a trailer hitch shown in FIG. 1 and designated 15. The hitch bar 12 is hollow and of square cross-section as is the hitch bar end 14 it receives. The apertures 16 in the side walls of the hitch bar 12 align with those 18 in the side walls of the end 14 when the latter is properly in place in the former so that a pin (not shown) may be inserted through the aligned apertures 16 and 18 to hold the hitch 15 connected to the automobile 10. When the trailer is not being hauled the hitch bar 12 is exposed and is unsightly particularly in the case of new automobiles. It is also dangerous and subject to damage because it scrapes when the automobile is driven up driveways and other inclines.

In accordance with the present invention a close-off device for the hitch bar 12 is provided which is indicated at 20. The device 20 closes off the open end of the hitch bar 12 and gives it a finished look. The device comprises a hollow tubular member 22 of square cross-section the rear end of which is of the same size as the trailer hitch end 14 and provided with apertures 24 in its side walls. The apertures 24 align with the apertures 16 in the hitch bar so that the device 20 may be held in place in the latter by a pin 25 (FIG. 3) inserted through the aligned apertures 16 and 24. The bottom wall of the member 22 is cut away at the front end of the device as at 26 to accommodate a heavy duty steel wheel 28 which is rotatably supported on an axle 30 affixed to and held fast by the side walls of the member 22. The wheel 28 rollably supports the rear end of the automobile 10 when it goes up driveways and other inclines and prevents scraping of the hitch bar 12. Also it provides a greater flexibility in locating the hitch bar 12 during its installation on the automobile.

It will thus be seen that there has been provided by the present invention improvements in trailer hitches in which the object hereinabove set forth has been successfully achieved. While a preferred embodiment of the invention has been shown and described it is to be understood that modifications, variations and changes may be resorted to without departing from the ambit of the invention as defined by the appended claims.

What is claimed is:

1. For use on road vehicle tractors equipped with a trailer hitch bar for receiving the projecting end of a trailer hitch, a close-off device for closing off the open end of said hitch bar comprising a member having a rear end insertable into said hitch bar, means on said rear end for removably affixing the device to said hitch bar, and a wheel rotatably mounted at the lower front end of said member for rollably supporting the rear end of the tractor when it goes up driveways and the like inclines such as would otherwise scrape the hitch bar.

2. Means as claimed in claim 1 in which said member has spaced side walls, an axle supported by and between said side walls, and a heavy duty steel wheel of a width substantially equal to the space between the side walls rotatably supported on said axle.

3. Means as claimed in claim 2 in which said member is a hollow tubular member of square cross-section, the bottom wall of which is cut away to accommodate said wheel, operative parts of said wheel projecting below said bottom wall and forwardly of said side walls.

References Cited by the Examiner

UNITED STATES PATENTS

| | | | |
|---|---|---|---|
| 2,608,430 | 8/1952 | Robert | 293—69 X |
| 2,834,608 | 5/1958 | Wixson | 293—17 X |
| 2,926,930 | 3/1960 | Pease | 280—475 |
| 3,043,618 | 7/1962 | Petirrojo | 293—69 X |

LEO FRIAGLIA, *Primary Examiner.*